United States Patent
Shah

(10) Patent No.: US 9,521,458 B2
(45) Date of Patent: Dec. 13, 2016

(54) IPTV TARGETED MESSAGES

(71) Applicant: Telefonaktiebolaget L M Ericsson (publ), Stockholm (SE)

(72) Inventor: Sunil Shah, San Jose, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 14/622,604

(22) Filed: Feb. 13, 2015

(65) Prior Publication Data

US 2016/0241911 A1     Aug. 18, 2016

(51) Int. Cl.
| | |
|---|---|
| H04N 7/16 | (2011.01) |
| H04N 21/454 | (2011.01) |
| H04L 12/18 | (2006.01) |
| H04N 21/472 | (2011.01) |
| H04N 21/488 | (2011.01) |
| H04N 21/61 | (2011.01) |
| H04N 21/6405 | (2011.01) |
| H04N 21/643 | (2011.01) |
| H04N 21/81 | (2011.01) |

(52) U.S. Cl.
CPC .......... *H04N 21/454* (2013.01); *H04L 12/185* (2013.01); *H04L 12/1859* (2013.01); *H04N 21/472* (2013.01); *H04N 21/4882* (2013.01); *H04N 21/6175* (2013.01); *H04N 21/6405* (2013.01); *H04N 21/64322* (2013.01); *H04N 21/812* (2013.01)

(58) Field of Classification Search
CPC . H04N 7/163; H04N 21/4532; H04N 5/44543
USPC ...... 725/27, 28, 93, 106, 116; 709/219, 225, 709/226, 228, 229, 232
See application file for complete search history.

(56) References Cited

U.S. PATENT DOCUMENTS

| | | | | |
|---|---|---|---|---|
| 7,805,131 B2* | 9/2010 | Cholkar | ................. | H04W 8/18 379/201.03 |
| 8,544,051 B1* | 9/2013 | Ramakrishnan | .... | H04J 14/0298 725/111 |
| 8,782,712 B2* | 7/2014 | Mehta | ................ | H04N 7/17318 725/59 |

(Continued)

OTHER PUBLICATIONS

Ali, Z., et al., "Node-IDS Based Resource Reservation Protocol (RSVP) Hello: A Clarification Statement", Network Working Group; RFC 4558; Jun. 2006; 7 pages.

(Continued)

*Primary Examiner* — Annan Shang
(74) *Attorney, Agent, or Firm* — Nicholson De Vos Webster & Elliott, LLP

(57) ABSTRACT

A network device executes a method to provide targeted messages to a subscriber of Internet Protocol Television (IPTV) when a request of the subscriber to access an IPTV channel is denied. The method includes receiving the request of the subscriber from a customer premise equipment (CPE) to access a first multicast stream, where the first multicast stream is a multicast stream for an IPTV channel. The method further includes checking whether the request to access the first multicast stream should be allowed or denied, determining a reason for denial in response to determining that the request should be denied, determining a second multicast stream that corresponds to the reason for denial, sending a join message to a multicast source to receive the second multicast stream, and forwarding the second multicast stream to the CPE.

22 Claims, 7 Drawing Sheets

(56) References Cited

U.S. PATENT DOCUMENTS

| | | | | |
|---|---|---|---|---|
| 8,849,989 | B2* | 9/2014 | Shah | 709/224 |
| 2005/0220132 | A1 | 10/2005 | Oman et al. | |
| 2006/0031872 | A1* | 2/2006 | Hsiao | H04N 5/44543 725/28 |
| 2007/0274313 | A1* | 11/2007 | Hsu | H04L 45/00 370/392 |
| 2008/0066126 | A1* | 3/2008 | Walter | H04N 7/17318 725/97 |
| 2008/0301745 | A1* | 12/2008 | Liu | H04N 21/2221 725/110 |
| 2009/0019469 | A1* | 1/2009 | Foti | H04L 63/0263 725/27 |
| 2009/0119715 | A1* | 5/2009 | Schwesinger | H04N 5/44543 725/58 |
| 2009/0147779 | A1* | 6/2009 | Foti | H04L 65/4076 370/389 |
| 2009/0147786 | A1* | 6/2009 | Li | H04L 12/185 370/390 |
| 2009/0198827 | A1* | 8/2009 | Hughes | H04N 7/17318 709/231 |
| 2010/0046528 | A1* | 2/2010 | Foti | H04L 12/185 370/401 |
| 2010/0172367 | A1* | 7/2010 | Foti | H04L 12/2861 370/431 |
| 2010/0223380 | A1* | 9/2010 | Zheng | H04L 65/403 709/224 |
| 2012/0075998 | A1* | 3/2012 | Shah | H04L 12/185 370/237 |
| 2013/0128887 | A1* | 5/2013 | Shah | H04L 12/185 370/390 |
| 2015/0249867 | A1* | 9/2015 | Wang | H04L 67/10 725/110 |

OTHER PUBLICATIONS

Andersson, L., et al., "LDP Specification", Network Working Group; RFC 5036; Oct. 2007; 135 pages.
Awduche, D., et al., "RSVP-TE: Extensions to RSVP for LSP Tunnels", Network Working Group; RFC 3209; Dec. 2001; 61 pages.
Babiarz, J., et al., "Configuration Guidelines for DiffServ Service Classes", Network Working Group; RFC 4594; Aug. 2006; 57 pages.
Baker, F., et al., "A Differentiated Services Code Point (DSCP) for Capacity-Admitted Traffic", Internet Engineering Task Force (IETF); RFC 5865; May 2010; 14 pages.
Baker, F., et al., "Management Information Base for the Differentiated Services Architecture", Network Working Group, Request for Comment: 3289, May 2002, 116 pages.
Berger, L., "Generalized Multi-Protocol Label Switching (GMPLS) Signaling Resource ReserVation Protocol-Traffic Engineering (RSVP-TE)", Network Working Group; RFC 3473; Jan. 2003; 42 pages.
Bernet, Y., et al., "An Informal Management Model for Diffsery Routers", Network Working Group; RFC 3290; May 2002; 56 pages.
Black, D., "Differentiated Services and Tunnels", Network Working Group; RFC 2983; Oct. 2000; 14 pages.
Black, D., et al., "Per Hop Behavior Identification Codes", Network Working Group; RFC 3140; Jun. 2001; 8 pages.
Blake, S., et al., "An Architecture for Differentiated Services", Network Working Group; RFC 2475; Dec. 1998; 36 pages.
Borman, D., et al., "IPv6 Jumbograms", Network Working Group, Request for Comments: 2675, Aug. 1999, 9 pages.
Braden, R., et al., "Resource ReSerVation Protocol (RSVP) Version 1 Functional Specification", Network Working Group, Request for Comment: 2205, Sep. 1997, 112 pages.
Chan, K., et al., "Differentiated Services Quality of Service Policy Information Base", Network Working Group; RFC 3317; Mar. 2003; 96 pages.

Charny, A., et al., "Supplemental Information for the New Definition of the EF PHB (Expedited Forwarding Per-Hop Behavior)", Network Working Group; RFC 3247; Mar. 2002; 24 pages.
Coltun, R., et al., "OSPF for IPv6", Network Working Group, Request for Comment: 5340, Jul. 2008, 94 pages.
Davie, B., et al., "An Expedited Forwarding PHB (Per-Hop Behavior)," Mar. 2002, 16 pages, Network Working Group, Request for Comments: 3246, The Internet Society.
Deering, S., et al., "Internet Protocol, Version 6 (IPv6) Specification", Network Working Group, Request for Comments: 2460, Dec. 1998, 39 pages.
Eggert, L., et al., "Unicast UDP Usage guidelines for Application Designers", Network Working Group; RFC 5405; Nov. 2008; 27 pages.
Fenner, B., et al., "Management Information Base for the User Datagram Protocol (UDP)", Network Working Group; RFC 4113; Jun. 2005; 19 pages.
Grossman, D., "New Terminology and Clarifications for Diffserv", Network Working Group; RFC 3260; Apr. 2002; 10 pages.
Hedrick, C., "Routing Information Protocol", Network Working Group; RFC 1058; Jun. 1988; 33 pages.
Heinanen, J., et al., "Assured Forwarding PHB Group", Network Working Group; RFC 2597; Jun. 1999; 11 pages.
Housley, R., et al., "Using Advanced Encryption Standard (AES) CCM Mode with IPsec Encapsulating Security Payload (ESP)", Network Working Group; RFC 4309; Dec. 2005; 13 pages.
Information Sciences Institute, University of Southern California, et al., "Transmission control protocol darpa internet program protocol specification", Sep. 1981, RFC: 793, 91 pages.
Kent, S., et al., "Security Architecture for the Internet Protocol", Network Working Group; RFC 4301; Dec. 2005; 101 pages.
Kompella, K., et al., "Procedures for Modifying the Resource reSerVation Protocol (RSVP)", Network Working Group; RFC 3936; Oct. 2004; 7 pages.
Malkin, G., "RIP Version 2", Network Working Group, Request for Comment: 2453, Nov. 1998, 39 pages.
Malkin, G., et al., "RIPng for IPv6", Network Working Group; RFC 2080; Jan. 1997; 19 pages.
Moy, J., "OSPF Version 2", Network Working Group, Request for Comments: 2328, Apr. 1998, 244 pages.
Nichols, K., et al., "Definition of Differentiated Services Per Domain Behaviors and Rules for their Specification", Network Working Group; RFC 3086; Apr. 2001; 24 pages.
Nichols, K., et al., "Definition of the Differentiated Services Field (DS Field) in the IPv4 and IPv6 Headers", Network Working Group; RFC 2474; Dec. 1998; 20 pages.
Oran, D., "OSI ISIS Intradomain Routing Protocol", Network Working Group, Request for Comments: 1142, (Feb. 1990), 157 pages.
Polk, J., et al., "A Resource Reservation Protocol (RSVP) Extension for the Reduction of Bandwidth of a Reservation Flow", Network Working Group; RFC 4495; May 2006; 21 pages.
Postel, J., "User Datagram Protocol", Aug. 28, 1980, 3 pages, RFC 768.
Rekhter, Y., et al., "A Border Gateway Protocol 4 (BGP-4)", Network Working Group; RFC 4271; Jan. 2006; 104 pages.
Rosen, E., et al., "BGP/MPLS IP Virtual Private Networks (VPNs)", Network Working Group, Request for Comment: 4364, Feb. 2006, 47 pages.
Shenker, S., et al., "Specification of Guaranteed Quality of Services", Network Working Group; RFC 2212; Sep. 1997; 20 pages.
Socolofsky, T., et al., "A TCP/IP Tutorial", Network Working Group; RFC 1180; Jan. 1991; 28 pages.
Wroclawski, J., "Specification of the Controlled-Load Network Element Service", Network Working Group; RFC 2211; Sep. 1997; 19 pages.
Wroclawski, J., "The Use of RSVP with IETF Integrated Services", Network Working Group; RFC 2210; Sep. 1997; 33 pages.
Hood, et al., "Gigabit-capable Passive Optical Networks," John Wiley & Sons, Inc., 2012, pp. 282-283.

\* cited by examiner

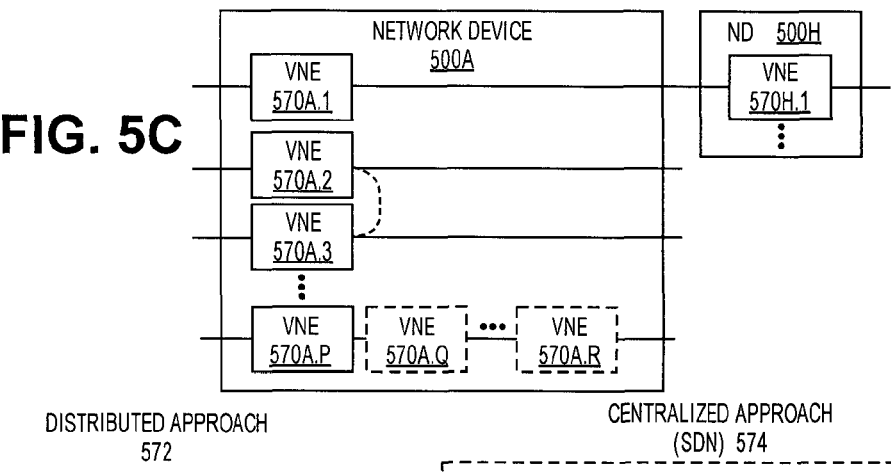
FIG. 5C
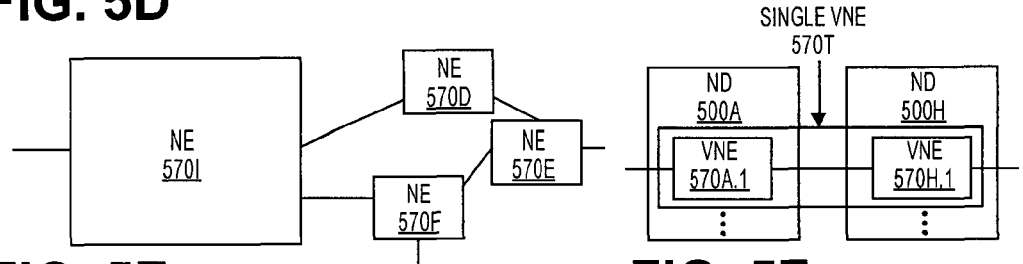
FIG. 5D
FIG. 5E
FIG. 5F

IPTV TARGETED MESSAGES

FIELD

Embodiments of the invention relate to the field of Internet Protocol Television (IPTV). More specifically, the embodiments relate to providing targeted messages to an IPTV subscriber.

BACKGROUND

Internet Protocol Television (IPTV) is a service that streams multimedia content over a packet-switched network using the Internet Protocol (IP) suite. IPTV uses multicasting to stream IPTV content from a multicast source to a multicast group. Subscribers may access a particular IPTV channel multicast stream by joining a multicast group corresponding to that IPTV channel.

A group management protocol such as Internet Group Management Protocol (IGMP) is typically used for joining and leaving multicast groups in IPTV. A subscriber that wishes to access an IPTV channel multicast stream will send an IGMP Report message to a network device such as a multicast router requesting access to the IPTV channel multicast stream. The network device receives the request and performs Connection Admission Control (CAC) operations to determine whether the subscriber's request should be allowed or denied.

If the subscriber's request is allowed, then the network device operates to forward the IPTV channel multicast stream to the subscriber. The IPTV channel multicast stream is delivered over a routing path established by a multicast routing protocol such as Protocol Independent Multicast (PIM). However, if the subscriber's request is denied, then the network device may decide to drop the subscriber's IGMP Report message.

There could be several reasons for the network device to drop the subscriber's IGMP Report message. For example, the subscriber's request could be denied because the subscriber is attempting to access a pay-per-view channel or attempting to exceed a bandwidth limit. If the network device decides to drop the subscriber's IGMP Report message, the subscriber will not receive the requested IPTV channel multicast stream and the subscriber will not know why their IPTV channel request did not go through.

SUMMARY

A method is implemented by a network device to provide targeted messages to a subscriber of Internet Protocol Television (IPTV) when a request of the subscriber to access an IPTV channel is denied. The method includes receiving the request of the subscriber from a customer premise equipment (CPE) to access a first multicast stream, where the first multicast stream is a multicast stream for an IPTV channel. The method further includes checking whether the request to access the first multicast stream should be allowed or denied, determining a reason for denial in response to determining that the request should be denied, determining a second multicast stream that corresponds to the reason for denial, sending a join message to a multicast source to receive the second multicast stream, and forwarding the second multicast stream to the CPE.

A network device is configured to provide targeted messages to a subscriber of Internet Protocol Television (IPTV) when a request of the subscriber to access an IPTV channel is denied. The network device includes a non-transitory machine readable storage medium to store a group management protocol module, an IPTV Connection Admission and Control (CAC) module, a multicast routing protocol module, and a multicast forwarding module. The network device also includes a network processor that is communicatively coupled to the non-transitory machine readable storage medium. The network processor is configured to execute the group management protocol module, the IPTV CAC module, the multicast routing protocol module, and the multicast forwarding module. The group management protocol module is configured to receive the request of the subscriber from a customer premise equipment (CPE) to access a first multicast stream, where the first multicast stream is a multicast stream for an IPTV channel. The IPTV CAC module is configured to check whether the request to access the first multicast stream should be allowed or denied, determine a reason for denial in response to determining that the request should be denied, and determine a second multicast stream that corresponds to the reason for denial. The multicast routing protocol module is configured to send a join message to a multicast source to receive the second multicast stream. The multicast forwarding module is configured to forward the second multicast stream to the CPE.

A non-transitory machine readable storage medium has stored therein instructions to be executed by a network device to provide targeted messages to a subscriber of Internet Protocol Television (IPTV) when a request of the subscriber to access an IPTV channel is denied. The instructions cause the network device to perform a set of operations including, receiving the request of the subscriber from a customer premise equipment (CPE) to access a first multicast stream, where the first multicast stream is a multicast stream for an IPTV channel. The execution further causes the network device to perform a set of operations including, checking whether the request to access the first multicast stream should be allowed or denied, determining a reason for denial in response to determining that the request should be denied, determining a second multicast stream that corresponds to the reason for denial, sending a join message to a multicast source to receive the second multicast stream, and forwarding the second multicast stream to the CPE.

A computing device implements a plurality of virtual machines for implementing network function virtualization (NFV), where a virtual machine from the plurality of virtual machines is configured to provide targeted messages to a subscriber of Internet Protocol Television (IPTV) when a request of the subscriber to access an IPTV channel is denied. The computing device includes a storage medium to store a group management protocol module, an IPTV Connection Admission and Control (CAC) module, a multicast routing protocol module, a multicast forwarding module, and a processor communicatively coupled to the storage medium. The processor is configured to execute the virtual machine, where the virtual machine is configured to implement the group management protocol module, the IPTV CAC module, the multicast routing protocol module, and the multicast forwarding module. The group management protocol module is configured to receive the request of the subscriber from a customer premise equipment (CPE) to access a first multicast stream, where the first multicast stream is a multicast stream for an IPTV channel. The IPTV CAC module is configured to check whether the request to access the first multicast stream should be allowed or denied, determine a reason for denial in response to determining that the request should be denied, and determine a second multicast stream that corresponds to the reason for denial. The multicast routing protocol module is configured to send a join message to a multicast source to receive the second multicast stream. The multicast forwarding module is configured to forward the second multicast stream to the CPE.

BRIEF DESCRIPTION OF THE DRAWINGS

The invention may best be understood by referring to the following description and accompanying drawings that are used to illustrate embodiments of the invention. In the drawings:

FIG. 5C illustrates various exemplary ways in which virtual network elements (VNEs) may be coupled according to some embodiments of the invention;

FIG. 5D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments of the invention;

FIG. 5E illustrates the simple case of where each of the NDs implements a single NE, but a centralized control plane has abstracted multiple of the NEs in different NDs into (to represent) a single NE in one of the virtual network(s), according to some embodiments of the invention;

FIG. 5F illustrates a case where multiple VNEs are implemented on different NDs and are coupled to each other, and where a centralized control plane has abstracted these multiple VNEs such that they appear as a single VNE within one of the virtual networks, according to some embodiments of the invention.

DETAILED DESCRIPTION

Figure 1:
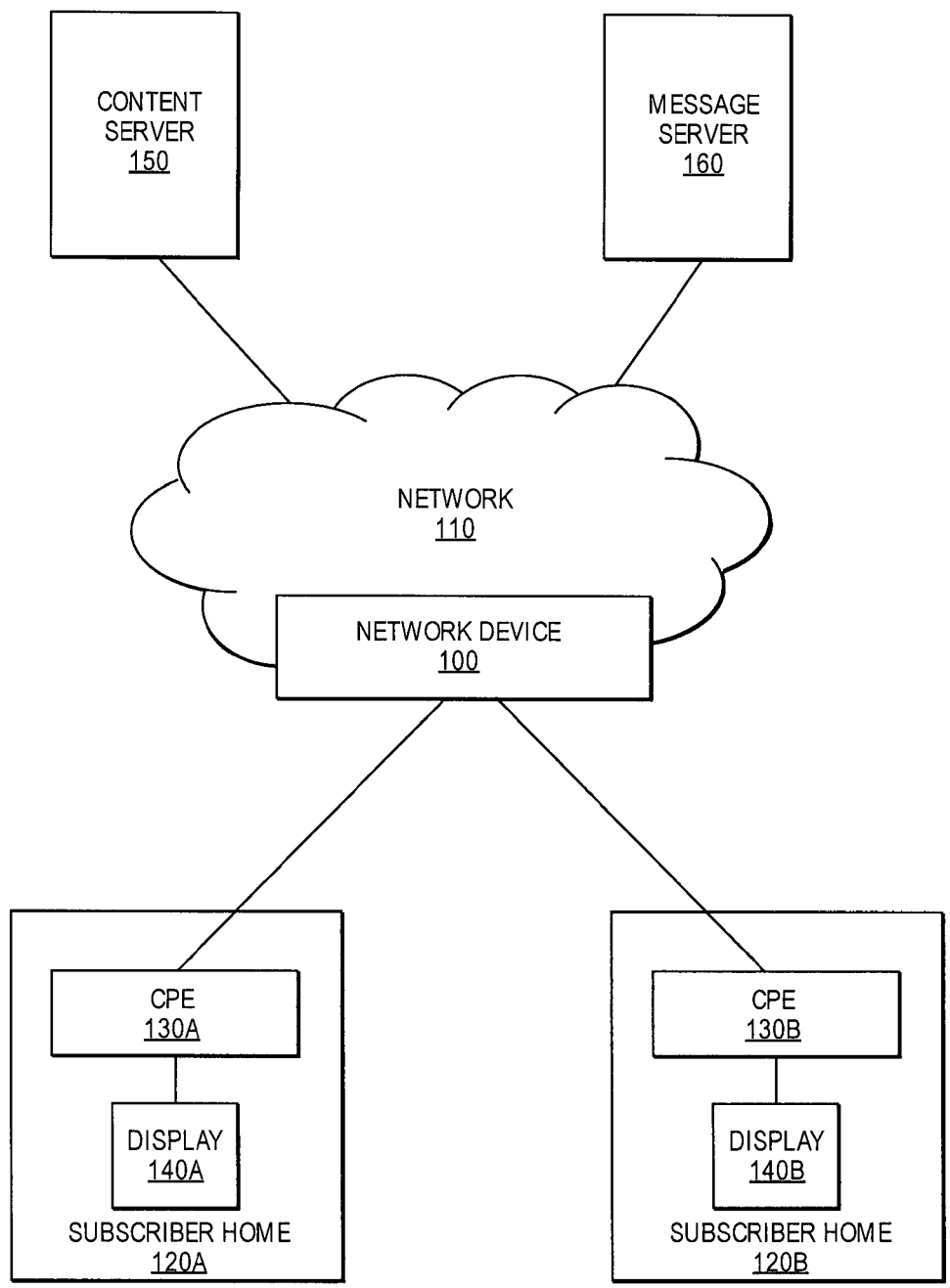
FIG. 1 is a block diagram illustrating one embodiment of a system for providing targeted IPTV messages to a subscriber.

The following description describes methods and apparatus for providing targeted messages to an Internet Protocol Television (IPTV) subscriber. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

When a subscriber sends a request to a network device to access an IPTV channel multicast stream, the network device may deny the request. There could be several reasons for denying access to the subscriber. For example, the subscriber's request may be denied because (1) the subscriber is attempting to access a pay-per-view channel; (2) the subscriber is attempting to access a High Definition (HD) channel, but has only paid for Standard Definition service; (3) the subscriber is attempting to exceed a bandwidth limit; (4) the subscriber is attempting to access a channel that is not part of the subscriber's IPTV package; or (5) another subscriber's traffic has higher priority than the subscriber's traffic. If the subscriber's request is denied (e.g., due to any of the reasons mentioned above or other reasons), the network device simply drops the subscriber's request. As a result, the subscriber does not receive the requested IPTV channel multicast stream and the subscriber does not know why their request did not go through.

The embodiments of the invention described herein below overcome the disadvantages of the prior art by providing a targeted message to a subscriber when the subscriber's request to access an IPTV channel multicast stream is denied. Instead of simply dropping the subscriber's request when the subscriber's request is denied, the network device maps the reason for denial to a targeted message multicast stream that provides information regarding the reason for denial and instructions on how to gain access to the requested IPTV channel multicast stream. The network device operates to forward the targeted message multicast stream to the subscriber so that the subscriber is informed of the reason for denial. Embodiments are described in further detail herein below.

FIG. 1 is a block diagram illustrating one embodiment of a system for providing targeted IPTV messages to a subscriber.

As illustrated in FIG. 1, the system includes a content server 150, a message server 160, a network 110, a network device 100, customer premise equipment (CPE) 130A-B, and display 140A-B. As shown, CPE 130A and display 140A are located within subscriber home 120A, while CPE 130B and display 140B are located within subscriber home 120B. In one embodiment, the CPE 130 is an IPTV set-top-box capable of receiving IPTV multicast streams from the content server 150 and targeted message multicast streams from the message server 160 over the network 110. In other embodiments, the CPE 130 can be any type of device that is capable of receiving IPTV multicast streams including desktops, laptops, mobile devices, tablets, servers, and similar devices. In this regard, the CPE 130 may provide all necessary signal processing and decoding functionality for displaying multicast streams on a display 140. In one embodiment, the functionality of the CPE 130 may be integrated into the display 140 (e.g., into a television) or integrated into a residential gateway or similar network device. Also, the CPE 130 may accept commands from the subscriber and transmit these commands to the network device 100. For example, the CPE 130 may accept a command from a subscriber to switch to a particular IPTV channel and the CPE 130 may then transmit a request for that IPTV channel to the network device 100.

The network 110 can be a wired or wireless network or any combination of wired and/or wireless networks. Additional devices, such as routers, servers, or other network devices may be included as part of the network 110 to achieve the transmission of data between the content/message servers 150, 160 and the subscriber's CPE 130.

In one embodiment, the subscriber's CPE 130 is connected to the network 110 through a network device 100. In one embodiment, the network device 100 is a Broadband Remote Access Server (BRAS) or a Broadband Network Gateway (BNG) or other type of provider edge router. The network device 100 may be capable of managing multicast group membership information for subscribers. For example, the network device 100 may accept requests from subscribers to join and leave multicast groups. In one embodiment, the network device 100 implements the Internet Group Management Protocol (IGMP) for managing multicast group membership in an Internet Protocol Version 4 (IPv4) network. In one embodiment, the network device 100 implements Multicast Listener Discovery (MLD) for managing multicast group membership in an Internet Protocol Version 6 (IPv6) network. The network device 100 may also implement a multicast routing protocol for establishing multicast distribution trees and forwarding multicast data to recipients. In one embodiment, the network device 100 implements Protocol Independent Multicast (PIM) as the multicast routing protocol.

In one embodiment, the subscriber home 120 includes a residential gateway (not shown) that connects the CPE 130 and other computing devices within the subscriber home 120 to the network device 100. The CPE 130 and other computing devices may connect to the residential gateway through a wired or wireless connection. In one embodiment, a Digital Subscriber Line Access Multiplexer (DSLAM) (not shown) aggregates traffic from multiple subscriber homes 120 and forwards the traffic to the network device 100. In one embodiment, the functionality of the DSLAM and the network device 100 are implemented by separate devices, while in other embodiments, the functionality of the DSLAM and the network device are implemented by a single device.

The content server 150 is capable of transmitting IPTV multicast streams for one or more IPTV channels over the network 110. Each IPTV multicast stream is forwarded from the content server 150 to respective multicast group members according to routing paths established by a multicast routing protocol (e.g., PIM). The IPTV multicast streams transmitted by the content server 150 may include video, graphics, audio, and other types of multimedia content.

The message server 160 is capable of transmitting multicast streams for one or more targeted messages over the network. Each targeted message multicast stream is forwarded from the message server 160 to respective multicast group members according to routing paths established by a multicast routing protocol (e.g., PIM). The targeted message multicast streams transmitted by the message server 160 may include video, graphics, audio, and other types of multimedia content. In one embodiment, the message server 160 transmits pre-recorded message streams that provide information related to a subscriber's request to access an IPTV channel multicast stream. For example, the targeted message multicast stream may include information regarding the reason that a subscriber was denied access to an IPTV channel multicast stream. Also, the targeted message multicast stream may include information regarding how the subscriber can gain access to an IPTV channel multicast stream. Although the content server 150 and the message server 160 are shown here as two distinct physical servers, embodiments are not so limited. In other embodiments, the functionality of the content server 150 and message server 160 could be implemented by the same physical server. Also, the system could include more than one content server 150 and/or more than one message server 160.

In one embodiment, the network device 100 performs Connection Admission Control (CAC) for subscribers. For example, when the network device 100 receives a request from a subscriber to access an IPTV channel multicast stream, the network device 100 determines whether the request should be allowed or denied. If the request is allowed, the network device 100 operates to forward the requested IPTV channel multicast stream to the subscriber. If the request is denied, the network device 100 may operate to provide a targeted message multicast stream to the subscriber, as will be described herein below in additional detail. In one embodiment, the network device 100 stores information regarding each subscriber such as which IPTV package a subscriber has purchased and/or which IPTV channels the subscriber is allowed to access. In other embodiments, such subscriber information is stored in a separate database accessible by the network device 100. The network device 100 may access such subscriber information to determine whether a subscriber's request should be allowed or denied. In one embodiment, the network device 100 may also implement Quality of Service (QoS) policies for subscribers.

Figure 2:
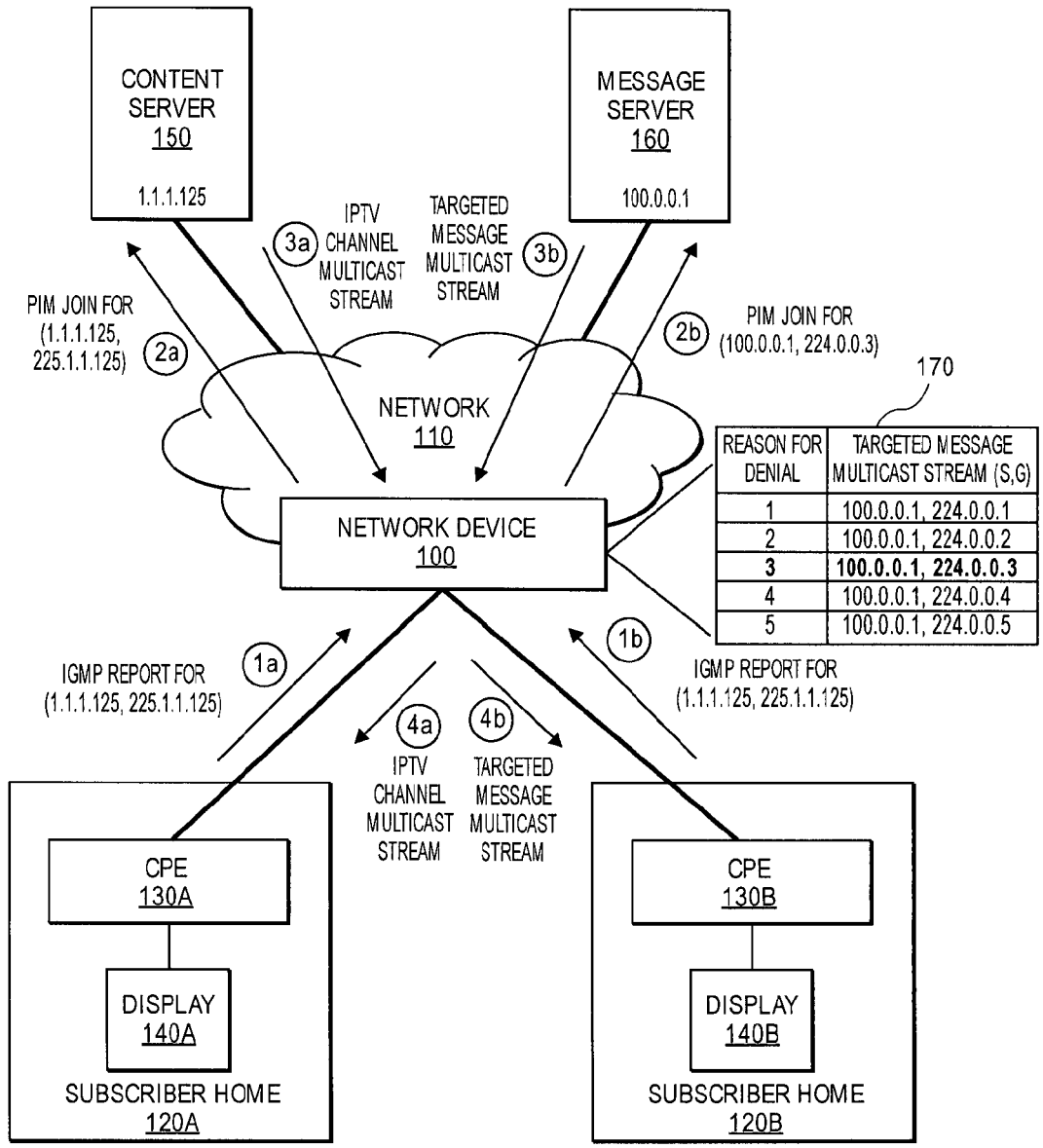
FIG. 2 is a block diagram illustrating one embodiment of messages that are exchanged for providing targeted IPTV messages to a subscriber.

FIG. 2 is a block diagram illustrating one embodiment of messages that are exchanged for providing targeted IPTV messages to a subscriber. For clarity and ease of understanding, FIG. 2 illustrates an embodiment in the context of the system described above with reference to FIG. 1. However, one having ordinary skill in the art will appreciate that the operations and concepts described herein below can be applied to different system configurations.

FIG. 2 illustrates how the network device 100 handles requests from two different subscribers, namely subscriber A from subscriber home 120A and subscriber B from subscriber home 120B. Both subscriber A and subscriber B make a request to access the same IPTV channel multicast stream, but the network device 100 handles the requests differently depending on whether the subscriber is allowed to access the requested IPTV channel multicast stream. In this example, subscriber A is allowed to access the IPTV channel multicast stream, while subscriber B is denied access to the IPTV channel multicast stream.

When subscriber A submits a command to its CPE 130A to access an IPTV channel multicast stream, the CPE 130A transmits an IGMP Report message to the network device 100. The IGMP Report message includes information about the requested IPTV channel multicast stream such as the multicast source address and the multicast destination address of the IPTV channel multicast stream. Throughout this disclosure, the multicast source address is often denoted as "S" and the multicast destination address is often denoted as "G". The combination of the multicast source address (S) and the multicast destination address (G) can uniquely identify a multicast stream, and will be referred to herein as an (S, G) pair. In one embodiment, the CPE 130 knows the (S, G) pair for one or more IPTV channel multicast streams. In one embodiment, such information regarding the (S, G) pair for IPTV channel multicast streams may be pre-provisioned within the CPE 130, manually entered into the CPE 130, or provided to the CPE 130 from an external source, for example through a software update over the network 110.

In this example, the multicast source for the requested IPTV channel multicast stream is the content server 150 having an IP address of 1.1.1.125. Also, the multicast destination address for the IPTV channel multicast stream is 225.1.1.125. Thus, the CPE 130A sends an IGMP Report message with an (S, G) pair of (1.1.1.125, 225.1.1.125) to the network device 100 (message 1a).

When the network device 100 receives the IGMP Report message from the CPE 130A, the network device 100 may perform CAC functionality. For example, the network device 100 may check whether the subscriber is authorized to access the requested IPTV channel multicast stream. In this example, the subscriber is authorized to access the requested IPTV channel multicast stream so the network device 100 sends a PIM Join message with an (S, G) pair of (1.1.1.125, 225.1.1.125) to the content server 150 (message 2a). The PIM Join message causes the IPTV channel multicast stream to be delivered to the network device 100 according to a routing path established by PIM (multicast stream 3a). The network device 100 forwards the IPTV channel multicast stream to the CPE 130A (multicast stream 4a) and the CPE 130A performs any signal processing and decoding functionality to display the IPTV channel multicast stream on the display 140A.

Subscriber B may also submit a command to its CPE 130B to access the same IPTV channel multicast stream as subscriber A. Similar to the example above with regard to subscriber A, when subscriber B submits a command to its CPE 130B to access the IPTV channel multicast stream, the CPE 130B transmits an IGMP Report message to the network device including an (S, G) pair of (1.1.1.125, 225.1.1.125) (message 1b). The network device 100 receives the IGMP Report message and checks whether the subscriber is authorized to access the requested IPTV channel multicast stream. In this example, the subscriber is not authorized to access the IPTV channel multicast stream because fulfilling the request would cause the subscriber to exceed the subscriber's bandwidth limit. As such, the network device 100 does not send a PIM Join message to the content server 150. Instead, the network device 100 determines the reason for denial and looks up the reason for denial in a mapping table 170 that maps the reason for denial to a targeted message multicast stream. The targeted message multicast stream may provide information regarding the reason for denial and instructions on how to gain access to the originally requested IPTV channel multicast stream. In this example, the mapping table maps the reason for denial (i.e., reason #3: subscriber is about to exceed a bandwidth limit) to a targeted message multicast stream having an (S, G) pair of (100.0.0.1, 224.0.0.3). Since the multicast source address (S) of the targeted message multicast stream is 100.0.0.1 (i.e., the IP address of the message server), the network device sends a PIM Join message with an (S, G) pair of (100.0.0.1, 224.0.0.3) to the message server 160 (message 2b). The PIM Join message causes the targeted message multicast stream to be delivered from the message server 160 to the network device 100 according to a routing path established by PIM (multicast stream 3b). Also, the network device 100 adds the subscriber's circuit in its outgoing interfaces list for the targeted message multicast stream so that the targeted message multicast stream can be forwarded to the subscriber B's CPE 130B. The CPE 130B receives the targeted message multicast stream (multicast stream 4b) and performs any signal processing and decoding functionality to display the targeted message multicast stream on the display 140B.

As a result, when subscriber B's request to access an IPTV channel multicast stream is denied, subscriber B receives the targeted message multicast stream, which may include information regarding the reason for denial. Thus, the subscriber's experience is improved because the customer is informed of the reason for denial instead of being left in the dark as to why the original request did not go through. Additionally, IPTV providers can use the targeted message multicast streams to increase their revenue by providing subscribers with information on how to gain access to the denied IPTV channel, such as pricing information and upgrade instructions.

Figure 3:
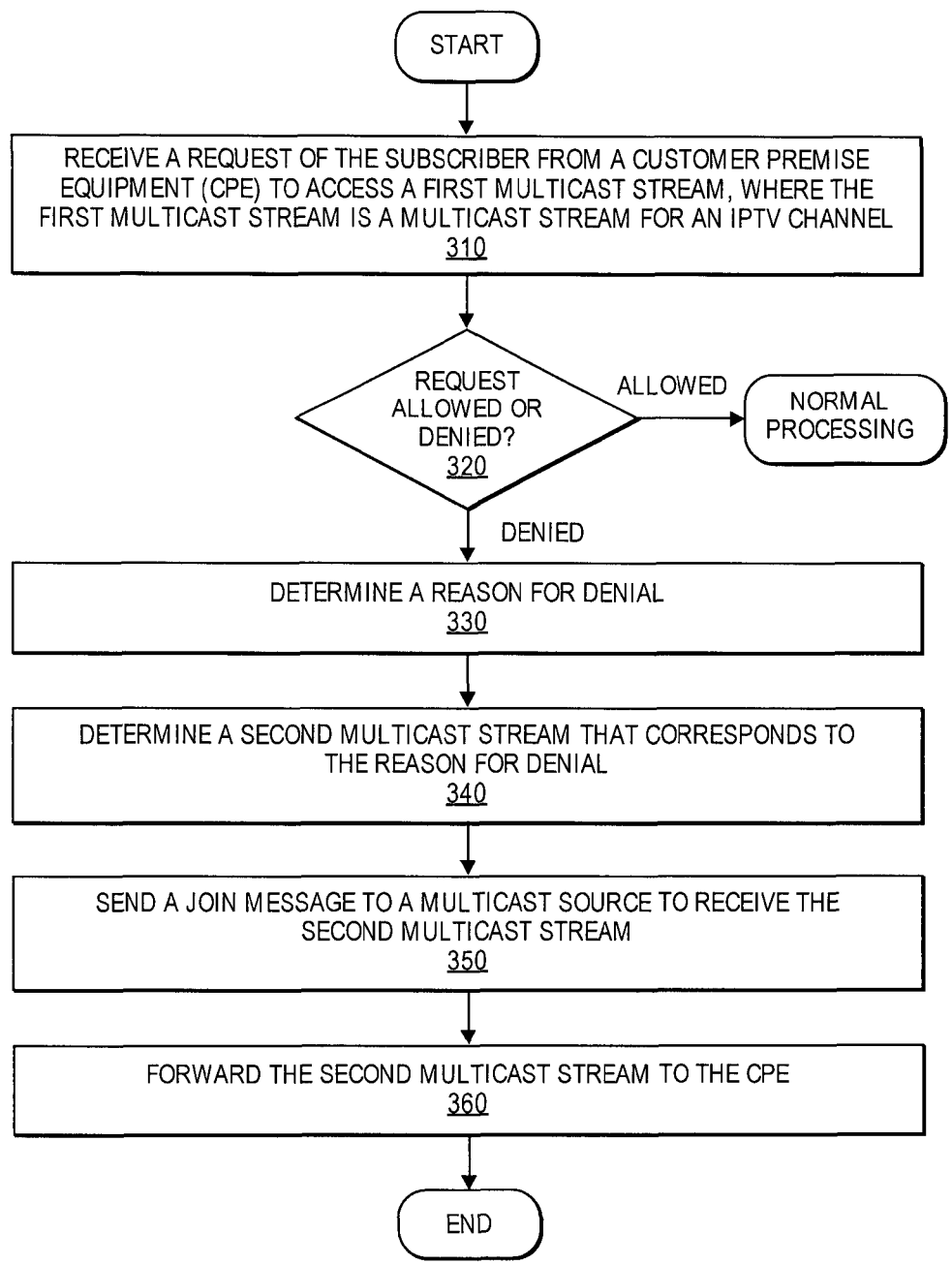
FIG. 3 is a flow diagram of one embodiment of a method for providing targeted IPTV messages to a subscriber.

FIG. 3 is a flow diagram of one embodiment of a method for providing targeted IPTV messages to a subscriber. In one embodiment, the operations of the flow diagrams may be performed by various components of a network device such as the network device 100 mentioned above with reference to FIGS. 1 and 2 or the network device 100 described with reference to FIG. 4 further herein below. The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams. While the flow diagram shows a particular order of operations performed by certain embodiments, it should be understood that such order is exemplary (e.g., alternative embodiments may perform the operations in a different order, combine certain operations, overlap certain operations, etc.).

In one embodiment, the process is initiated when a group management protocol module of the network device 100 receives a request from a CPE of a subscriber to access a first multicast stream (block 310). In one embodiment, the first multicast stream is an IPTV channel multicast stream. The first multicast stream may include video, graphics, audio, and other types of multimedia content. Also, the first multicast stream can include high definition content or standard definition content. In an embodiment that employs IGMP as the group management protocol, the request to access the first multicast stream is an IGMP message. The request can be an IGMPv1 message, IGMPv2 message, IGMPv3 message, or similar message. For example, the request may be an IGMPv3 Report message including a multicast source address (S) and a multicast destination address (G) corresponding to an IPTV channel multicast stream. In an embodiment that employs MLD as the group management protocol, the request to access the first multicast stream is a Multicast Listener Discovery (MLD) message. The request can be a MLDv1 message, a MLDv2 message, or similar message. One having ordinary skill in the art will understand that the request can be a message that conforms to other types of group management protocols other than IGMP and MLD. The group management protocol module of the network device 100 may implement any functionality of a group management protocol to establish and manage multicast groups.

An IPTV CAC module of the network device 100 checks whether the received request should be allowed or denied (decision block 320). If the request is allowed, then the network device 100 proceeds with normal processing for streaming the first multicast stream to the CPE 130. For example, the network device 100 may send a PIM Join message to the multicast source address (S) indicated in the request to receive the first multicast stream. The network device can then forward the first multicast stream to the CPE 130. Returning to decision block 320, if the request is denied, then the IPTV CAC module of the network device 100 determines a reason for denial (block 330). There could be many reasons that a request to access the first multicast stream is denied. Reasons for denying the request may include, but are not limited to: (1) the subscriber is attempting to access a pay-per-view channel; (2) the subscriber is attempting to access a High Definition (HD) channel, but has only paid for Standard Definition service; (3) the subscriber is attempting to exceed a bandwidth limit; (4) the subscriber is attempting to access a channel that is not part of the subscriber's IPTV package; and (5) another subscriber's traffic has higher priority than the subscriber's traffic. In one embodiment, the IPTV CAC module of the network device 100 accesses a subscriber information database to determine whether the subscriber's request should be allowed/denied and the reason for denial. The subscriber information database can include subscriber information such as which IPTV package the subscriber has purchased, which IPTV channels the subscriber is allowed to access, and other information regarding the subscriber.

After determining the reason for denial, the IPTV CAC module of the network device 100 determines a second multicast stream that corresponds to the reason for denial (block 340). In one embodiment, the IPTV CAC module of the network device 100 determines the second multicast stream by consulting a mapping table 170 that maps the reason for denial to an (S, G) pair of the second multicast stream. The mapping table 170 may map each reason for denial (e.g., reasons (1)-(5) discussed above) to a corresponding multicast stream. Each corresponding multicast stream can be a targeted message multicast stream that provides information regarding the corresponding reason for denial. Additionally, in some embodiments, the corresponding multicast stream can provide instructions on how to gain access to the denied first multicast stream. The second multicast stream may include video, graphics, audio, and other types of multimedia content. Also, the second multicast stream can include high definition content or standard definition content.

A multicast routing protocol module of the network device 100 sends a join message to a multicast source to receive the second multicast stream (block 350). Instead of sending a join message to the multicast source address (S) of the first multicast stream, as would occur if the subscriber had access to the first multicast stream, the multicast routing protocol module of the network device 100 sends a join message to a multicast source of the second multicast stream (i.e., the multicast stream corresponding to the reason for denial). The join message causes the second multicast stream to be delivered from the multicast source of the second multicast stream to the network device 100 according to a routing path established by a multicast routing protocol. In an embodiment that employs the PIM multicast routing protocol, the join message can be a PIM Join message. The PIM Join message may include the multicast source address (S) and multicast destination address (G) of the second multicast stream. In other embodiments, the join message can be a join message or equivalent message for a different type of multicast routing protocol. The multicast routing protocol module of the network device 100 may implement any functionality of a multicast routing protocol to establish multicast distribution trees for forwarding multicast streams. In one embodiment, the network device 100 adds the subscriber's circuit to its outgoing interfaces list for the second multicast stream in connection with sending the join message so that the network device is configured to forward the second multicast stream to the CPE.

A multicast forwarding module of the network device 100 then forwards the second multicast stream to the CPE (block 360). Thus, the second multicast stream is displayed to the subscriber, which can include information regarding the reason that the subscriber's original request was denied and also include instructions on how to gain access to the originally requested multicast stream.

While the embodiments discussed above primarily describe a use case for providing a reason for denial to the subscriber, embodiments are not so limited. For example, the message server 160 can be used to deliver targeted promotions and/or advertisements to the subscriber. For example, during a commercial break, the network device 100 may temporarily prune the subscriber's circuit from an outgoing interfaces list for a regular IPTV channel multicast stream and add the subscriber's circuit to an outgoing interfaces list for a multicast stream playing an advertisement targeting the subscriber's profile. In one embodiment, the network device may determine the subscriber's profile from a subscriber information database. In one embodiment, the network device 100 may send a join message to the message server 160 or similar server that serves as the source of the advertisement multicast stream (e.g., an advertisement server) to receive the advertisement multicast stream. After the commercial break, the subscriber's circuit can be added back to the outgoing interfaces list for the regular IPTV channel multicast stream. Other use cases as would occur to one having ordinary skill in the art are contemplated as well.

Figure 4:
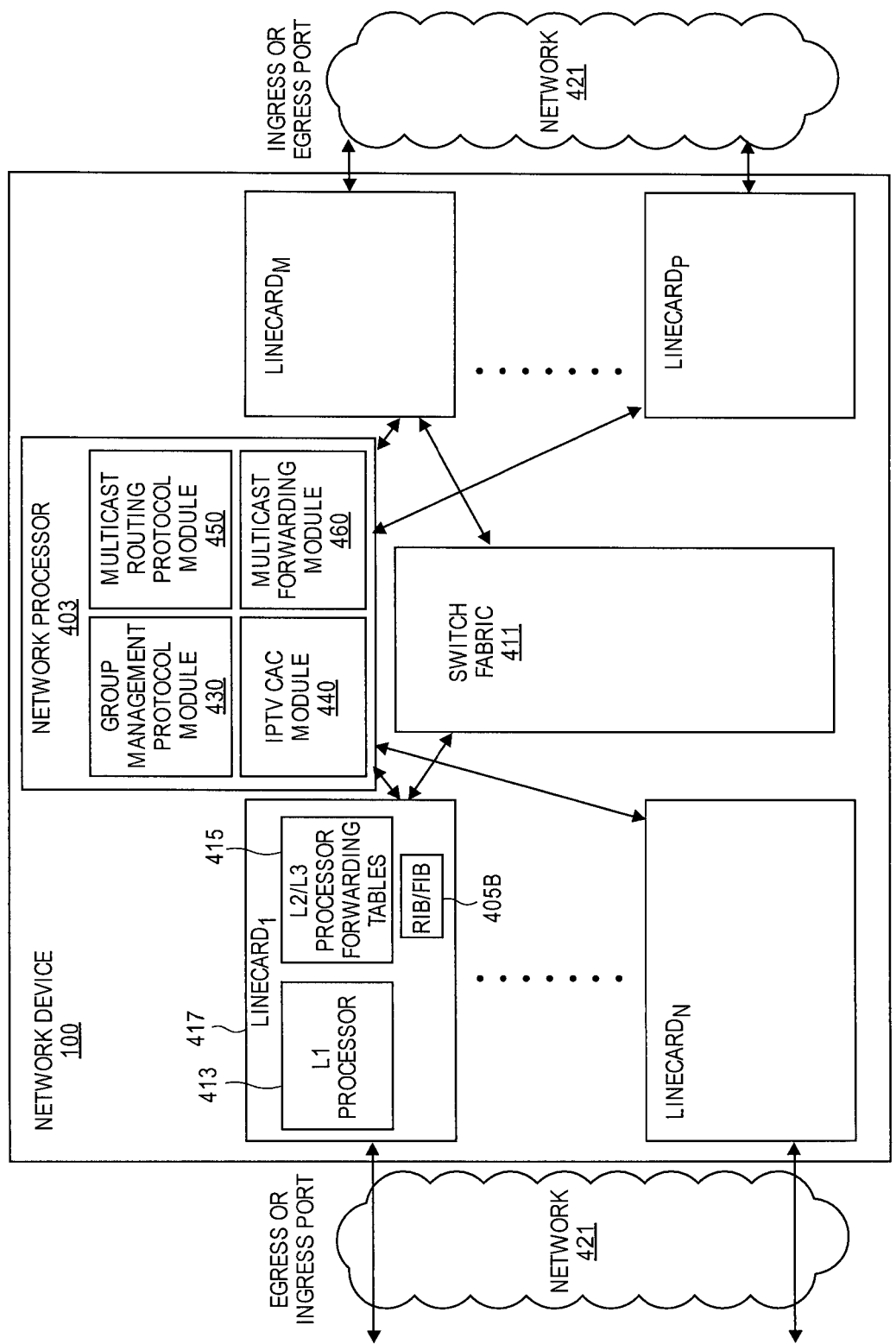
FIG. 4 is a block diagram of one embodiment of a network device that can provide targeted IPTV messages to an IPTV subscriber.

FIG. 4 is a block diagram of one embodiment of a network device that can provide targeted IPTV messages to an IPTV subscriber.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. A 'set,' as used herein, refers to any positive whole number of items. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

In one embodiment, the targeted IPTV message process is implemented by a network device 100 or router or similar computing device. The network device 100 can have any structure that enables it to receive data traffic and forward it toward its destination. The network device 100 can include a network processor 403 or set of network processors that execute the functions of the network device 100. A 'set,' as used herein, is any positive whole number of items including one item. The network device 100 can execute targeted IPTV message functionality via a network processor 403 or other components (e.g., group management protocol module 430, IPTV CAC module 440, multicast routing protocol module 450, and multicast forwarding module 460) of the network device 100.

The targeted IPTV message process functions can be implemented as modules in any combination of software, including firmware, and hardware within the network device 100. The functions of the targeted IPTV message process that are executed and implemented by the network device 100 include those described further herein above.

In one embodiment, the network device 100 can include a set of line cards 417 that process and forward the incoming data traffic toward the respective destination nodes by identifying the destination and forwarding the data traffic to the appropriate line card 417 having an egress port that leads to or toward the destination via a next hop. These line cards 417 can also implement the routing information base or forwarding information base 405B, or a relevant subset thereof. The line cards 417 can also implement or facilitate the targeted IPTV message process functions described herein above. The line cards 417 are in communication with one another via a switch fabric 411 and communicate with other nodes over attached networks 421 using Ethernet, fiber optic or similar communication links and media.

In other embodiments, the processes can be implemented by a split-architecture node, where the control plane is remote from the data/forwarding plane. In this case, the targeted IPTV message process can be carried out at any combination of the data plane nodes and the central controller.

As described herein, operations performed by the network device 100 may refer to specific configurations of hardware such as application specific integrated circuits (ASICs) configured to perform certain operations or having a predetermined functionality, or software instructions stored in memory embodied in a non-transitory computer readable storage medium. Thus, the techniques shown in the figures can be implemented using code and data stored and executed on one or more electronic devices (e.g., an end station, a network element, a network device). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. One or more parts of an embodiment of the invention may be implemented using different combinations of software, firmware, and/or hardware.

Figures 5A, 5B:
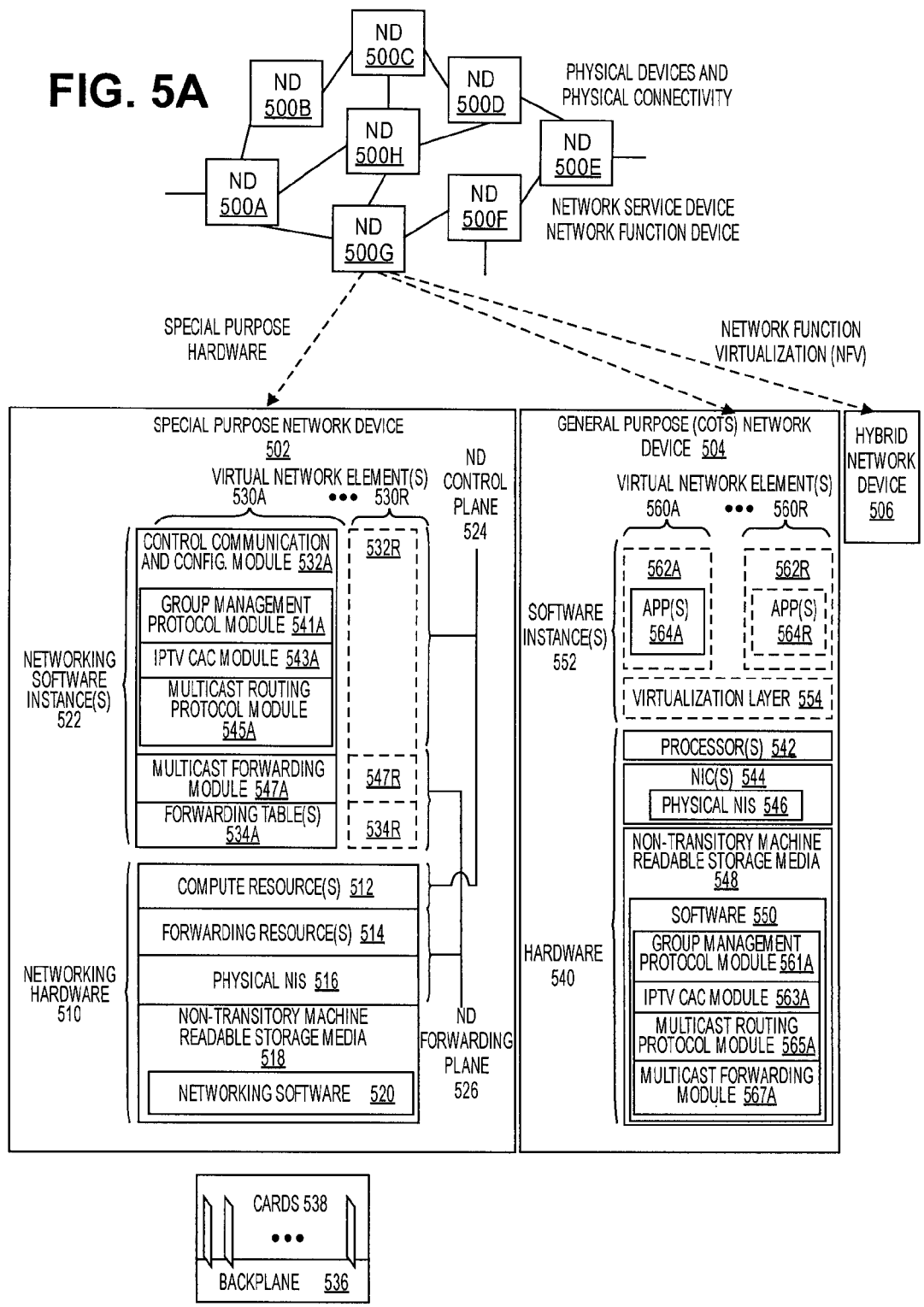
FIG. 5A illustrates connectivity between network devices (NDs) within an exemplary network, as well as three exemplary implementations of the NDs, according to some embodiments of the invention.
FIG. 5B illustrates an exemplary way to implement a special-purpose network device according to some embodiments of the invention.

FIG. 5A illustrates connectivity between network devices (NDs) within an exemplary network, as well as three exemplary implementations of the NDs, according to some embodiments of the invention. FIG. 5A shows NDs 500A-H, and their connectivity by way of lines between A-B, B-C, C-D, D-E, E-F, F-G, and A-G, as well as between H and each of A, C, D, and G. These NDs are physical devices, and the connectivity between these NDs can be wireless or wired (often referred to as a link). An additional line extending from NDs 500A, E, and F illustrates that these NDs act as ingress and egress points for the network (and thus, these NDs are sometimes referred to as edge NDs; while the other NDs may be called core NDs).

Two of the exemplary ND implementations in FIG. 5A are: 1) a special-purpose network device 502 that uses custom application-specific integrated-circuits (ASICs) and a proprietary operating system (OS); and 2) a general purpose network device 504 that uses common off-the-shelf (COTS) processors and a standard OS.

The special-purpose network device 502 includes networking hardware 510 comprising compute resource(s) 512 (which typically include a set of one or more processors), forwarding resource(s) 514 (which typically include one or more ASICs and/or network processors), and physical network interfaces (NIs) 516 (sometimes called physical ports), as well as non-transitory machine readable storage media 518 having stored therein networking software 520. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 500A-H. During operation, the networking software 520 may be executed by the networking hardware 510 to instantiate a set of one or more networking software instance(s) 522. Each of the networking software instance(s) 522, and that part of the networking hardware 510 that executes that network software instance (be it hardware dedicated to that networking software instance and/or time slices of hardware temporally shared by that networking software instance with others of the networking software instance(s) 522), form a separate virtual network element 530A-R. Each of the virtual network element(s) (VNEs) 530A-R includes a control communication and configuration module 532A-R (sometimes referred to as a local control module or control communication module) and forwarding table(s) 534A-R, such that a given virtual network element (e.g., 530A) includes the control communication and configuration module (e.g., 532A), a set of one or more forwarding table(s) (e.g., 534A), and that portion of the networking hardware 510 that executes the virtual network element (e.g., 530A). In one embodiment, group management protocol module 541A, IPTV CAC module 543A, and multicast routing protocol module 545A implement the processes described herein above as part of the control communication and configuration module 532A or similar aspect of the networking software, which may be loaded and stored in the non-transitory machine readable media 518 or in a similar location. In one embodiment, a multicast forwarding module (e.g., 547A, 547R) may implement forwarding of multicast streams as described herein above.

The special-purpose network device 502 is often physically and/or logically considered to include: 1) a ND control plane 524 (sometimes referred to as a control plane) comprising the compute resource(s) 512 that execute the control communication and configuration module(s) 532A-R; and 2) a ND forwarding plane 526 (sometimes referred to as a forwarding plane, a data plane, or a media plane) comprising the forwarding resource(s) 514 that utilize the forwarding table(s) 534A-R and the physical NIs 516. By way of example, where the ND is a router (or is implementing routing functionality), the ND control plane 524 (the compute resource(s) 512 executing the control communication and configuration module(s) 532A-R) is typically responsible for participating in controlling how data (e.g., packets) is to be routed (e.g., the next hop for the data and the outgoing physical NI for that data) and storing that routing information in the forwarding table(s) 534A-R, and the ND forwarding plane 526 is responsible for receiving that data on the physical NIs 516 and forwarding that data out the appropriate ones of the physical NIs 516 based on the forwarding table(s) 534A-R.

FIG. 5B illustrates an exemplary way to implement the special-purpose network device 502 according to some embodiments of the invention. FIG. 5B shows a special-purpose network device including cards 538 (typically hot pluggable). While in some embodiments the cards 538 are of two types (one or more that operate as the ND forwarding plane 526 (sometimes called line cards), and one or more that operate to implement the ND control plane 524 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec) (RFC 4301 and 4309), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 536 (e.g., a first full mesh coupling the line cards and a second full mesh coupling all of the cards).

Returning to FIG. 5A, the general purpose network device 504 includes hardware 540 comprising a set of one or more processor(s) 542 (which are often COTS processors) and network interface controller(s) 544 (NICs; also known as network interface cards) (which include physical NIs 546), as well as non-transitory machine readable storage media 548 having stored therein software 550. Software 550 may include a group management protocol module 561A, IPTV CAC module 563A, multicast routing protocol module 565A, and multicast forwarding module 567A that implement the processes described herein above. During operation, the processor(s) 542 execute the software 550 to instantiate one or more sets of one or more applications 564A-R. While one embodiment does not implement virtualization, alternative embodiments may use different forms of virtualization—represented by a virtualization layer 554 and software containers 562A-R. For example, one such alternative embodiment implements operating system-level virtualization, in which case the virtualization layer 554 represents the kernel of an operating system (or a shim executing on a base operating system) that allows for the creation of multiple software containers 562A-R that may each be used to execute one of the sets of applications 564A-R. In this embodiment, the multiple software containers 562A-R (also called virtualization engines, virtual private servers, or jails) are each a user space instance (typically a virtual memory space); these user space instances are separate from each other and separate front the kernel space in which the operating system is run; the set of applications running in a given user space, unless explicitly allowed, cannot access the memory of the other processes. Another such alternative embodiment implements full virtualization, in which case: 1) the virtualization layer 554 represents a hypervisor (sometimes referred to as a virtual machine monitor (VMM)) or a hypervisor executing on top of a host operating system; and 2) the software containers 562A-R each represent a tightly isolated form of software container called a virtual machine that is run by the hypervisor and may include a guest operating system. A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications 564A-R, as well as the virtualization layer 554 and software containers 562A-R if implemented, are collectively referred to as software instance(s) 552. Each set of applications 564A-R, corresponding software container 562A-R if implemented, and that part of the hardware 540 that executes them (be it hardware dedicated to that execution and/or time slices of hardware temporally shared by software containers 562A-R), forms a separate virtual network element(s) 560A-R. In one embodiment, the software containers 562A-R may execute the described group management protocol module 561A, IPTV CAC module 563A, multicast routing protocol module 565A, multicast forwarding module 567A, and related software described herein above.

The virtual network element(s) 560A-R perform similar functionality to the virtual network element(s) 530A-R—e.g., similar to the control communication and configuration module(s) 532A and forwarding table(s) 534A (this virtualization of the hardware 540 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). However, different embodiments of the invention may implement one or more of the software container(s) 562A-R differently. For example, while embodiments of the invention are illustrated with each software container 562A-R corresponding to one VNE 560A-R, alternative embodiments may implement this correspondence at a finer level granularity (e.g., line card virtual machines virtualize line cards, control card virtual machine virtualize control cards, etc.); it should be understood that the techniques described herein with reference to a correspondence of software containers 562A-R to VNEs also apply to embodiments where such a finer level of granularity is used.

In certain embodiments, the virtualization layer 554 includes a virtual switch that provides similar forwarding services as a physical Ethernet switch. Specifically, this virtual switch forwards traffic between software containers 562A-R and the NIC(s) 544, as well as optionally between the software containers 562A-R; in addition, this virtual switch may enforce network isolation between the VNEs 560A-R that by policy are not permitted to communicate with each other (e.g., by honoring virtual local area networks (VLANs)).

The third exemplary ND implementation in FIG. 5A is a hybrid network device 506, which includes both custom ASICs/proprietary OS and COTS processors/standard OS in a single ND or a single card within an ND. In certain embodiments of such a hybrid network device, a platform VM (i.e., a VM that that implements the functionality of the special-purpose network device 502) could provide for para-virtualization to the networking hardware present in the hybrid network device 506.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 530A-R, VNEs 560A-R, and those in the hybrid network device 506) receives data on the physical NIs (e.g., 516, 546) and forwards that data out the appropriate ones of the physical NIs (e.g., 516, 546). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP) (RFC 768, 2460, 2675, 4113, and 5405), Transmission Control Protocol (TCP) (RFC 793 and 1180), and differentiated services (DSCP) values (RFC 2474, 2475, 2597, 2983, 3086, 3140, 3246, 3247, 3260, 4594, 5865, 3289, 3290, and 3317).

FIG. 5C illustrates various exemplary ways in which VNEs may be coupled according to some embodiments of the invention. FIG. 5C shows VNEs 570A.1-570A.P (and optionally VNEs 570A.Q-570A.R) implemented in ND 500A and VNE 570H.1 in ND 500H. In FIG. 5C, VNEs 570A.1-P are separate from each other in the sense that they can receive packets from outside ND 500A and forward packets outside of ND 500A; VNE 570A.1 is coupled with VNE 570H.1, and thus they communicate packets between their respective NDs; VNE 570A.2-570A.3 may optionally forward packets between themselves without forwarding them outside of the ND 500A; and VNE 570A.P may optionally be the first in a chain of VNEs that includes VNE 570A.Q followed by VNE 570A.R (this is sometimes referred to as dynamic service chaining, where each of the VNEs in the series of VNEs provides a different service—e.g., one or more layer 4-7 network services). While FIG. 5C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 5A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 5A may also host one or more such servers (e.g., in the case of the general purpose network device 504, one or more of the software containers 562A-R may operate as servers; the same would be true for the hybrid network device 506; in the case of the special-purpose network device 502, one or more such servers could also be run on a virtualization layer executed by the compute resource(s) 512); in which case the servers are said to be co-located with the VNEs of that ND.

A virtual network is a logical abstraction of a physical network (such as that in FIG. 5A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN RFC 4364) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

FIG. 5D illustrates a network with a single network element on each of the NDs of FIG. 5A, and within this straight forward approach contrasts a traditional distributed approach (commonly used by traditional routers) with a centralized approach for maintaining reachability and forwarding information (also called network control), according to some embodiments of the invention. Specifically, FIG. 5D illustrates network elements (NEs) 570A-H with the same connectivity as the NDs 500A-H of FIG. 5A.

FIG. 5D illustrates that the distributed approach 572 distributes responsibility for generating the reachability and forwarding information across the NEs 570A-H; in other words, the process of neighbor discovery and topology discovery is distributed.

For example, where the special-purpose network device 502 is used, the control communication and configuration module(s) 532A-R of the ND control plane 524 typically include a reachability and forwarding information module to implement one or more routing protocols (e.g., an exterior gateway protocol such as Border Gateway Protocol (BGP) (RFC 4271), Interior Gateway Protocol(s) (IGP) (e.g., Open Shortest Path First (OSPF) (RFC 2328 and 5340), Intermediate System to Intermediate System (IS-IS) (RFC 1142), Routing Information Protocol (RIP) (version 1 RFC 1058, version 2 RFC 2453, and next generation RFC 2080)), Label Distribution Protocol (LDP) (RFC 5036), Resource Reservation Protocol (RSVP) (RFC 2205, 2210, 2211, 2212, as well as RSVP-Traffic Engineering (TE): Extensions to RSVP for LSP Tunnels RFC 3209, Generalized Multi-Protocol Label Switching (GMPLS) Signaling RSVP-TE RFC 3473, RFC 3936, 4495, and 4558)) that communicate with other NEs to exchange routes, and then selects those routes based on one or more routing metrics. Thus, the NEs 570A-H (e.g., the compute resource(s) 512 executing the control communication and configuration module(s) 532A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 524. The ND control plane 524 programs the ND forwarding plane 526 with information (e.g., adjacency and route information) based on the routing structure(s). For example, the ND control plane 524 programs the adjacency and route information into one or more forwarding table(s) 534A-R (e.g., Forwarding Information Base (FIB), Label Forwarding Information Base (LFIB), and one or more adjacency structures) on the ND forwarding plane 526. For layer 2 forwarding, the ND can store one or more bridging tables that are used to forward data based on the layer 2 information in that data. While the above example uses the special-purpose network device 502, the same distributed approach 572 can be implemented on the general purpose network device 504 and the hybrid network device 506.

FIG. 5D illustrates that a centralized approach 574 (also known as software defined networking (SDN)) that decouples the system that makes decisions about where traffic is sent from the underlying systems that forwards traffic to the selected destination. The illustrated centralized approach 574 has the responsibility for the generation of reachability and forwarding information in a centralized control plane 576 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 576 has a south bound interface 582 with a data plane 580 (sometime referred to the infrastructure layer, network forwarding plane, or forwarding plane (which should not be confused with a ND forwarding plane)) that includes the NEs 570A-H (sometimes referred to as switches, forwarding elements, data plane elements, or nodes). The centralized control plane 576 includes a network controller 578, which includes a centralized reachability and forwarding information module 579 that determines the reachability within the network and distributes the forwarding information to the NEs 570A-H of the data plane 580 over the south bound interface 582 (which may use the OpenFlow protocol). Thus, the network intelligence is centralized in the centralized control plane 576 executing on electronic devices that are typically separate from the NDs. In one embodiment, the centralized reachability and forwarding information module 579 may include the targeted IPTV message module 581 and related software as described herein above. In one embodiment, the targeted IPTV message module 581 can configure multicast distribution trees to forward a targeted message multicast stream to appropriate subscribers and send this information to the NEs 570A-H of the data plane 580 over the south bound interface 582.

For example, where the special-purpose network device 502 is used in the data plane 580, each of the control communication and configuration module(s) 532A-R of the ND control plane 524 typically include a control agent that provides the VNE side of the south bound interface 582. In this case, the ND control plane 524 (the compute resource(s) 512 executing the control communication and configuration module(s) 532A-R) performs its responsibility for participating in controlling how data (e.g., packets) is to be routed (e.g., the next hop for the data and the outgoing physical NI for that data) through the control agent communicating with the centralized control plane 576 to receive the forwarding information (and in some cases, the reachability information) from the centralized reachability and forwarding information module 579 (it should be understood that in some embodiments of the invention, the control communication and configuration module(s) 532A-R, in addition to communicating with the centralized control plane 576, may also play some role in determining reachability and/or calculating forwarding information—albeit less so than in the case of a distributed approach; such embodiments are generally considered to fall under the centralized approach 574, but may also be considered a hybrid approach).

While the above example uses the special-purpose network device 502, the same centralized approach 574 can be implemented with the general purpose network device 504 (e.g., each of the VNE 560A-R performs its responsibility for controlling how data (e.g., packets) is to be routed (e.g., the next hop for the data and the outgoing physical NI for that data) by communicating with the centralized control plane 576 to receive the forwarding information (and in some cases, the reachability information) from the centralized reachability and forwarding information module 579; it should be understood that in some embodiments of the invention, the VNEs 560A-R, in addition to communicating with the centralized control plane 576, may also play some role in determining reachability and/or calculating forwarding information—albeit less so than in the case of a distributed approach) and the hybrid network device 506. In fact, the use of SDN techniques can enhance the NFV techniques typically used in the general purpose network device 504 or hybrid network device 506 implementations as NFV is able to support SDN by providing an infrastructure upon which the SDN software can be run, and NFV and SDN both aim to make use of commodity server hardware and physical switches.

FIG. 5D also shows that the centralized control plane 576 has a north bound interface 584 to an application layer 586, in which resides application(s) 588. The centralized control plane 576 has the ability to form virtual networks 592 (sometimes referred to as a logical forwarding plane, network services, or overlay networks (with the NEs 570A-H of the data plane 580 being the underlay network)) for the application(s) 588. Thus, the centralized control plane 576 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 5D shows the distributed approach 572 separate from the centralized approach 574, the effort of network control may be distributed differently or the two combined in certain embodiments of the invention. For example: 1) embodiments may generally use the centralized approach (SDN) 574, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 574, but may also be considered a hybrid approach.

While FIG. 5D illustrates the simple case where each of the NDs 500A-H implements a single NE 570A-H, it should be understood that the network control approaches described with reference to FIG. 5D also work for networks where one or more of the NDs 500A-H implement multiple VNEs (e.g., VNEs 530A-R, VNEs 560A-R, those in the hybrid network device 506). Alternatively or in addition, the network controller 578 may also emulate the implementation of multiple VNEs in a single ND. Specifically, instead of (or in addition to) implementing multiple VNEs in a single ND, the network controller 578 may present the implementation of a VNE/NE in a single ND as multiple VNEs in the virtual networks 592 (all in the same one of the virtual network(s) 592, each in different ones of the virtual network(s) 592, or some combination). For example, the network controller 578 may cause an ND to implement a single VNE (a NE) in the underlay network, and then logically divide up the resources of that NE within the centralized control plane 576 to present different VNEs in the virtual network(s) 592 (where these different VNEs in the overlay networks are sharing the resources of the single VNE/NE implementation on the ND in the underlay network).

On the other hand, FIGS. 5E and 5F respectively illustrate exemplary abstractions of NEs and VNEs that the network controller 578 may present as part of different ones of the virtual networks 592. FIG. 5E illustrates the simple case of where each of the NDs 500A-H implements a single NE 570A-H (see FIG. 5D), but the centralized control plane 576 has abstracted multiple of the NEs in different NDs (the NEs 570A-C and G-H) into (to represent) a single NE 5701 in one of the virtual network(s) 592 of FIG. 5D, according to some embodiments of the invention. FIG. 5E shows that in this virtual network, the NE 5701 is coupled to NE 570D and 570F, which are both still coupled to NE 570E.

FIG. 5F illustrates a case where multiple VNEs (VNE 570A.1 and VNE 570H.1) are implemented on different NDs (ND 500A and ND 500H) and are coupled to each other, and where the centralized control plane 576 has abstracted these multiple VNEs such that they appear as a single VNE 570T within one of the virtual networks 592 of FIG. 5D, according to some embodiments of the invention. Thus, the abstraction of a NE or VNE can span multiple NDs.

While some embodiments of the invention implement the centralized control plane 576 as a single entity (e.g., a single instance of software running on a single electronic device), alternative embodiments may spread the functionality across multiple entities for redundancy and/or scalability purposes (e.g., multiple instances of software running on different electronic devices).

Figure 6:
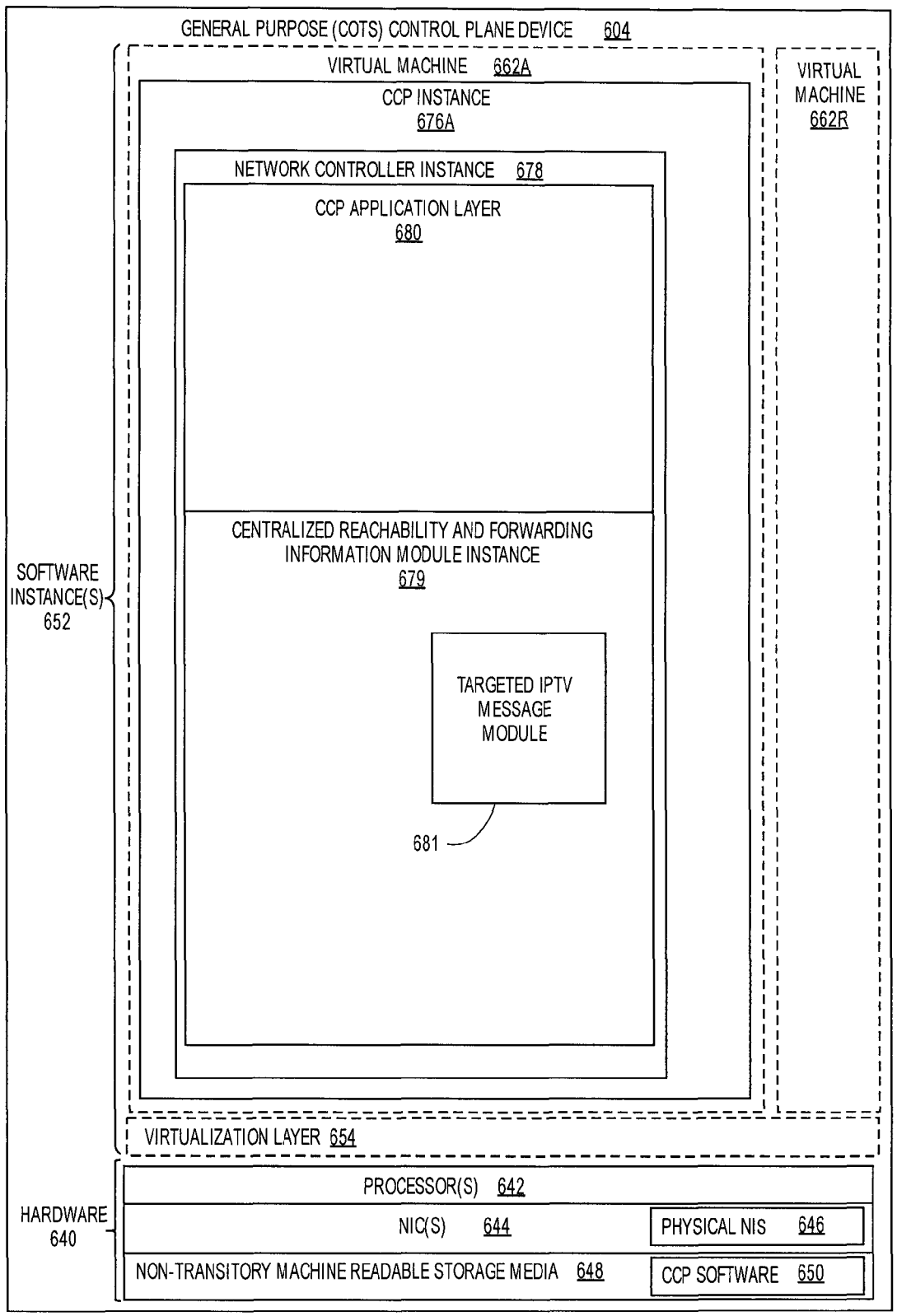
FIG. 6 illustrates a general purpose control plane device with centralized control plane (CCP) software, according to some embodiments of the invention.

Similar to the network device implementations, the electronic device(s) running the centralized control plane 576, and thus the network controller 578 including the centralized reachability and forwarding information module 579, may be implemented a variety of ways (e.g., a special purpose device, a general-purpose (e.g., COTS) device, or hybrid device). These electronic device(s) would similarly include compute resource(s), a set or one or more physical NICs, and a non-transitory machine-readable storage medium having stored thereon the centralized control plane software. For instance, FIG. 6 illustrates, a general purpose control plane device 604 including hardware 640 comprising a set of one or more processor(s) 642 (which are often COTS processors) and network interface controller(s) 644 (NICs; also known as network interface cards) (which include physical NIs 646), as well as non-transitory machine readable storage media 648 having stored therein centralized control plane (CCP) software 650.

In embodiments that use compute virtualization, the processor(s) 642 typically execute software to instantiate a virtualization layer 654 and software container(s) 662A-R (e.g., with operating system-level virtualization, the virtualization layer 654 represents the kernel of an operating system (or a shim executing on a base operating system) that allows for the creation of multiple software containers 662A-R (representing separate user space instances and also called virtualization engines, virtual private servers, or jails) that may each be used to execute a set of one or more applications; with full virtualization, the virtualization layer 654 represents a hypervisor (sometimes referred to as a virtual machine monitor (VMM)) or a hypervisor executing on top of a host operating system, and the software containers 662A-R each represent a tightly isolated form of software container called a virtual machine that is run by the hypervisor and may include a guest operating system; with para-virtualization, an operating system or application running with a virtual machine may be aware of the presence of virtualization for optimization purposes). Again, in embodiments where compute virtualization is used, during operation an instance of the CCP software 650 (illustrated as CCP instance 676A) is executed within the software container 662A on the virtualization layer 654. In embodiments where compute virtualization is not used, the CCP instance 676A on top of a host operating system is executed on the "bare metal" general purpose control plane device 604. The instantiation of the CCP instance 676A, as well as the virtualization layer 654 and software containers 662A-R if implemented, are collectively referred to as software instance(s) 652.

In some embodiments, the CCP instance 676A includes a network controller instance 678. The network controller instance 678 includes a centralized reachability and forwarding information module instance 679 (which is a middleware layer providing the context of the network controller 578 to the operating system and communicating with the various NEs), and an CCP application layer 680 (sometimes referred to as an application layer) over the middleware layer (providing the intelligence required for various network operations such as protocols, network situational awareness, and user—interfaces). At a more abstract level, this CCP application layer 680 within the centralized control plane 576 works with virtual network view(s) (logical view(s) of the network) and the middleware layer provides the conversion from the virtual networks to the physical view. In one embodiment, the centralized reachability and forwarding information module 679 may include the targeted IPTV message module 681 and related software as described herein above. In one embodiment, the targeted IPTV message module 681 can configure multicast distribution trees to forward a targeted message multicast stream to appropriate subscribers.

The centralized control plane 576 transmits relevant messages to the data plane 580 based on CCP application layer 680 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 580 may receive different messages, and thus different forwarding information. The data plane 580 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 580, the packet (or a subset of the packet header and content) is typically forwarded to the centralized control plane 576. The centralized control plane 576 will then program forwarding table entries into the data plane 580 to accommodate packets belonging to the flow of the unknown packet. Once a specific forwarding table entry has been programmed into the data plane 580 by the centralized control plane 576, the next packet with matching credentials will match that forwarding table entry and take the set of actions associated with that matched entry.

While the invention has been described in terms of several embodiments, those skilled in the art will recognize that the invention is not limited to the embodiments described, can be practiced with modification and alteration within the spirit and scope of the descriptions provided herein. The description is thus to be regarded as illustrative instead of limiting.

The invention claimed is:

1. A method implemented by a network device to provide targeted messages to a subscriber of Internet Protocol Television (IPTV) when a request of the subscriber to access an IPTV channel is denied, the method comprising:
   receiving the request of the subscriber from a customer premise equipment (CPE) to access a first multicast stream, wherein the first multicast stream is a multicast stream for an IPTV channel;
   checking whether the request to access the first multicast stream is denied;
   determining a reason for denial in response to determining that the request is denied;
   determining a second multicast stream that corresponds to the reason for denial;
   sending a join message to a multicast source to receive the second multicast stream; and
   forwarding the second multicast stream to the CPE.

2. The method of claim 1, wherein the request to access the first multicast stream is an Internet Group Management Protocol (IGMP) message.

3. The method of claim 1, wherein the request to access the first multicast stream is a Multicast Listener Discovery (MLD) message.

4. The method of claim 1, wherein the reason for denial is any one of: the subscriber is attempting to access a pay-per-view IPTV channel, the subscriber is attempting to access a High Definition (HD) IPTV channel when the subscriber has only paid for Standard Definition service, the subscriber is attempting to exceed a bandwidth limit, the subscriber is attempting to watch an IPTV channel that is not part of the subscriber's IPTV package, and another subscriber's traffic has higher priority than the subscriber's traffic.

5. The method of claim 1, wherein determining the second multicast stream that corresponds to the reason for denial comprises:
   looking up a multicast source address (S) and a multicast destination address (G) of the second multicast stream in a mapping table based on the reason for denial, wherein the mapping table maps the reason for denial to an (S, G) pair of the second multicast stream.

6. The method of claim 5, wherein the join message is sent to the multicast source address of the second multicast stream.

7. The method of claim 1, wherein the join message is a Protocol Independent Multicast (PIM) JOIN message.

8. The method of claim 1, wherein the second multicast stream provides information regarding the reason for denial and instructions on how to gain access to the first multicast stream.

9. The method of claim 1, further comprising:
   configuring an outgoing interfaces list for the second multicast stream to forward the second multicast stream to the CPE.

10. The method of claim 1, further comprising:
    forwarding the first multicast stream to the CPE in response to determining that the request is allowed;
    configuring an outgoing interfaces list for the first multicast stream to temporarily stop forwarding of the first multicast stream to the CPE at a start of a commercial break;
    sending a join message to a multicast source to receive an advertisement multicast stream, wherein the advertisement multicast stream is a multicast stream playing an advertisement targeting the subscriber's profile;
    configuring an outgoing interfaces list for an advertisement multicast stream to forward the advertisement multicast stream to the CPE;
    forwarding the advertisement multicast stream to the CPE; and
    configuring the outgoing interfaces list for the first multicast stream to resume forwarding of the first multicast stream to the CPE after the commercial break is over.

11. A network device configured to provide targeted messages to a subscriber of Internet Protocol Television (IPTV) when a request of the subscriber to access an IPTV channel is denied, the network device comprising:
    a non-transitory machine readable storage medium having stored therein a group management protocol module, an IPTV Connection Admission and Control (CAC) module, a multicast routing protocol module, and a multicast forwarding module; and
    a network processor communicatively coupled to the non-transitory machine readable storage medium, the network processor configured to execute the group management protocol module, the IPTV CAC module, the multicast routing protocol module, and the multicast forwarding module, wherein the group management protocol module is configured to receive the request of the subscriber from a customer premise equipment (CPE) to access a first multicast stream, where the first multicast stream is a multicast stream for an IPTV channel, the IPTV CAC module configured to check whether the request to access the first multicast stream is denied, determine a reason for denial in response to determining that the request is denied, and determine a second multicast stream that corresponds to the reason for denial, the multicast routing protocol module configured to send a join message to a multicast source to receive the second multicast stream, the multicast forwarding module configured to forward the second multicast stream to the CPE.

12. A non-transitory machine readable storage medium having stored therein instructions to be executed by a network device to provide targeted messages to a subscriber of Internet Protocol Television (IPTV) when a request of the subscriber to access an IPTV channel is denied, the instructions when executed by the network device cause the network device to perform a set of operations comprising:
    receiving the request of the subscriber from a customer premise equipment (CPE) to access a first multicast stream, wherein the first multicast stream is a multicast stream for an IPTV channel;

checking whether the request to access the first multicast stream is denied;

determining a reason for denial in response to determining that the request is denied;

determining a second multicast stream that corresponds to the reason for denial;

sending a join message to a multicast source to receive the second multicast stream; and forwarding the second multicast stream to the CPE.

13. The non-transitory machine readable storage medium of claim 12, wherein the request to access the first multicast stream is an Internet Group Management Protocol (IGMP) message.

14. The non-transitory machine readable storage medium of claim 12, wherein the request to access the first multicast stream is a Multicast Listener Discovery (MLD) message.

15. The non-transitory machine readable storage medium of claim 12, wherein the reason for denial is any one of: the subscriber is attempting to access a pay-per-view IPTV channel, the subscriber is attempting to access a High Definition (HD) IPTV channel when the subscriber has only paid for Standard Definition service, the subscriber is attempting to exceed a bandwidth limit, the subscriber is attempting to watch an IPTV channel that is not part of the subscriber's IPTV package, and another subscriber's traffic has higher priority than the subscriber's traffic.

16. The non-transitory machine readable storage medium of claim 12, wherein determining the second multicast stream that corresponds to the reason for denial comprises:

looking up a multicast source address (S) and a multicast destination address (G) of the second multicast stream in a mapping table based on the reason for denial, wherein the mapping table maps the reason for denial to an (S, G) pair of the second multicast stream.

17. The non-transitory machine readable storage medium of claim 16, wherein the join message is sent to the multicast source address of the second multicast stream.

18. The non-transitory machine readable storage medium of claim 12, wherein the join message is a Protocol Independent Multicast (PIM) JOIN message.

19. The non-transitory machine readable storage medium of claim 12, wherein the second multicast stream includes information regarding the reason for denial and instructions on how to gain access to the first multicast stream.

20. The non-transitory machine readable storage medium of claim 12, wherein the instructions when executed by the network device cause the network device to perform a further set of operations comprising:

configuring an outgoing interfaces list for the second multicast stream to forward the second multicast stream to the CPE.

21. The non-transitory machine readable storage medium of claim 12, wherein the instructions when executed by the network device cause the network device to perform a further set of operations comprising:

forwarding the first multicast stream to the CPE in response to determining that the request is allowed;

configuring an outgoing interfaces list for the first multicast stream to temporarily stop forwarding of the first multicast stream to the CPE at a start of a commercial break;

sending a join message to a multicast source to receive an advertisement multicast stream, wherein the advertisement multicast stream is a multicast stream playing an advertisement targeting the subscriber's profile;

configuring an outgoing interfaces list for an advertisement multicast stream to forward the advertisement multicast stream to the CPE;

forwarding the advertisement multicast stream to the CPE; and configuring the outgoing interfaces list for the first multicast stream to resume forwarding of the first multicast stream to the CPE after the commercial break is over.

22. A computing device implementing a plurality of virtual machines for implementing network function virtualization (NFV), wherein a virtual machine from the plurality of virtual machines is configured to provide targeted messages to a subscriber of Internet Protocol Television (IPTV) when a request of the subscriber to access an IPTV channel is denied, the computing device comprising:

a storage medium having stored therein a group management protocol module, an IPTV Connection Admission and Control (CAC) module, a multicast routing protocol module, and a multicast forwarding module; and a processor communicatively coupled to the storage medium, the processor configured to execute the virtual machine, where the virtual machine is configured to implement the group management protocol module, the IPTV CAC module, the multicast routing protocol module, and the multicast forwarding module, wherein the group management protocol module is configured to receive the request of the subscriber from a customer premise equipment (CPE) to access a first multicast stream, where the first multicast stream is a multicast stream for an IPTV channel, the IPTV CAC module configured to check whether the request to access the first multicast stream is denied, determine a reason for denial in response to determining that the request is denied, and determine a second multicast stream that corresponds to the reason for denial, the multicast routing protocol module configured to send a join message to a multicast source to receive the second multicast stream, the multicast forwarding module configured to forward the second multicast stream to the CPE.

* * * * *